July 28, 1931.　　　　J. T. ZELLERS　　　　1,816,036
SHEET GLASS DRAWING APPARATUS
Filed June 11, 1928　　　2 Sheets-Sheet 1
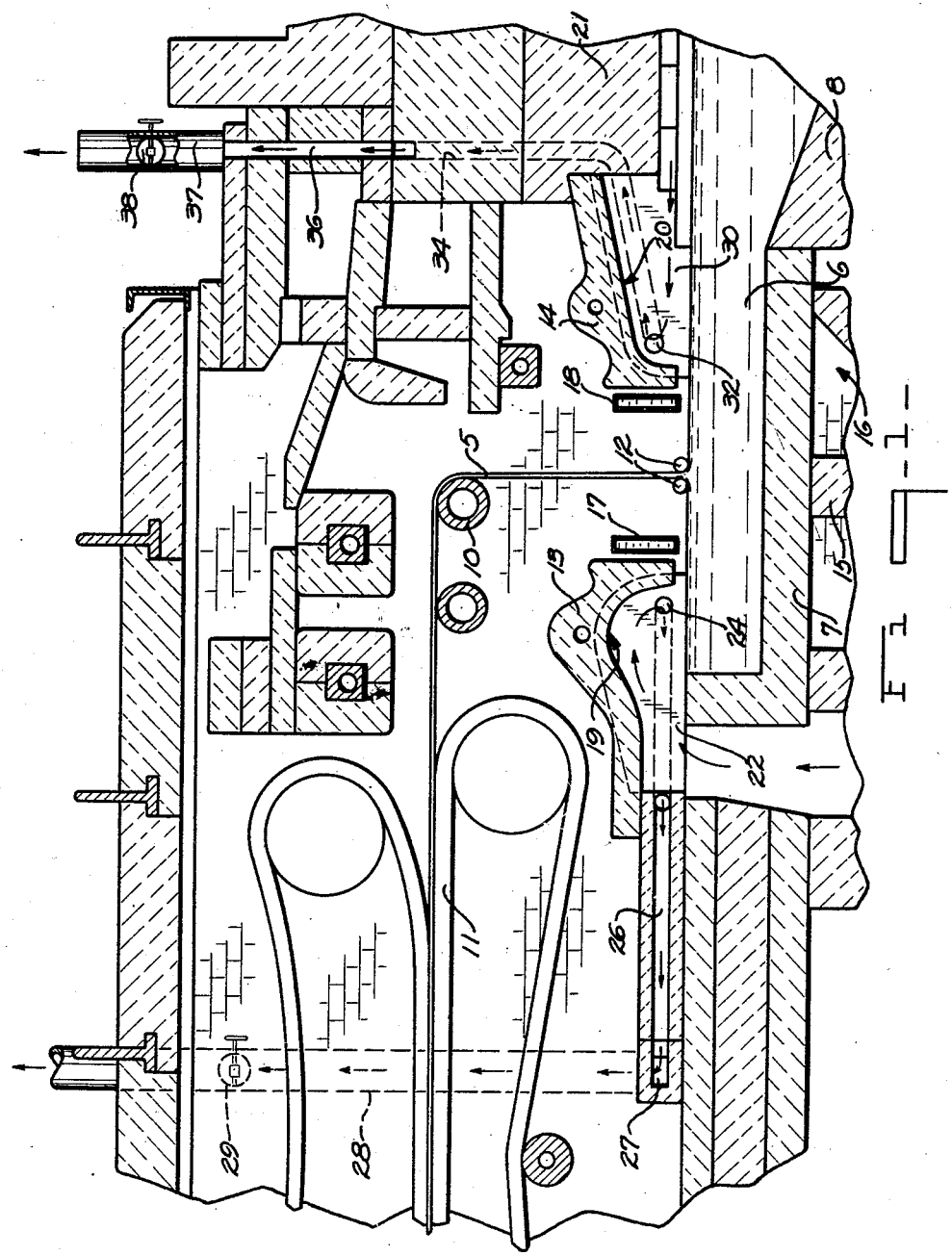
Inventor
James T. Zellers
By Frank Fraser
Attorney

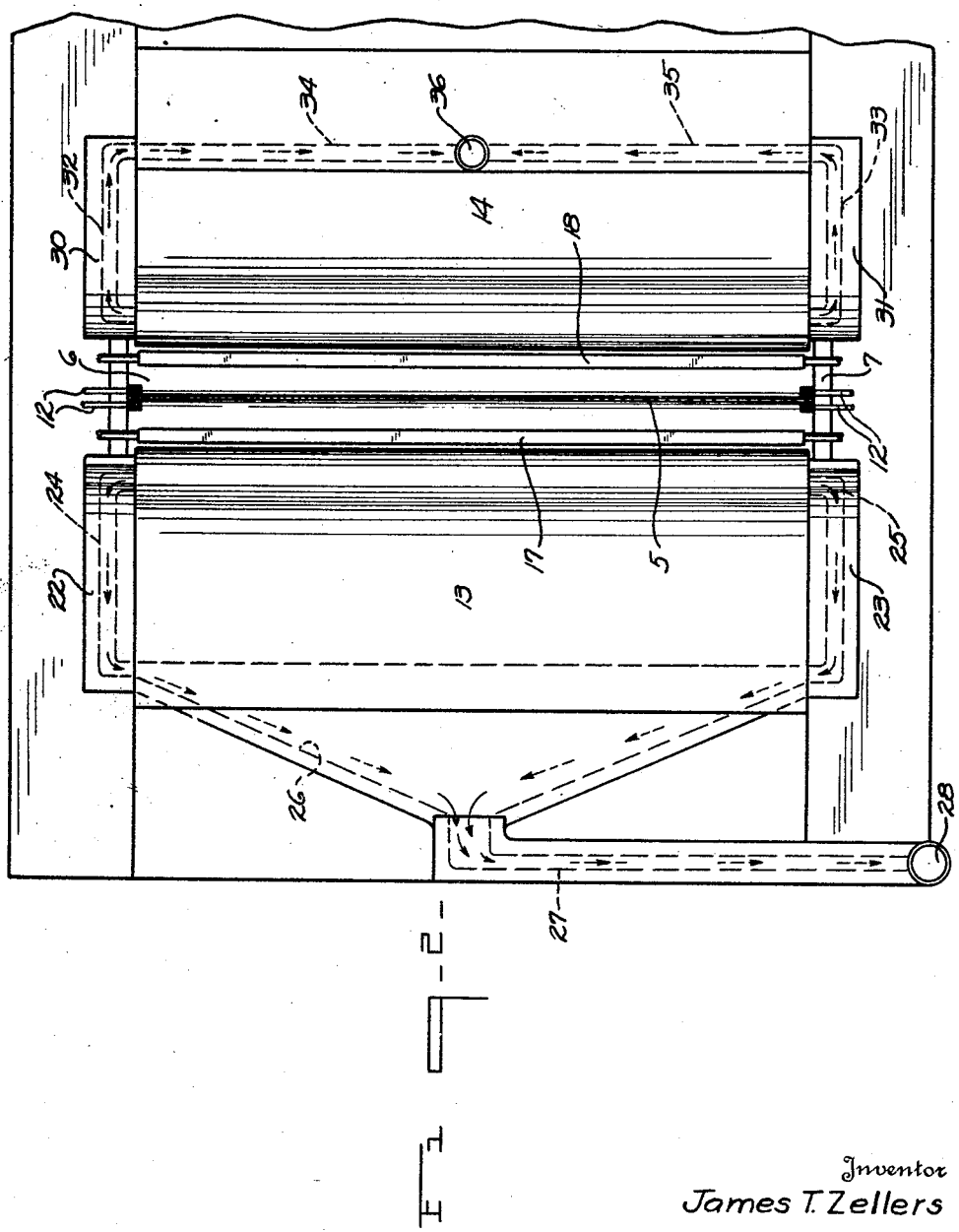

Patented July 28, 1931

1,816,036

UNITED STATES PATENT OFFICE

JAMES T. ZELLERS, OF SHREVEPORT, LOUISIANA, ASSIGNOR TO LIBBEY-OWENS-FORD GLASS COMPANY, OF TOLEDO, OHIO, A CORPORATION OF OHIO

SHEET GLASS DRAWING APPARATUS

Application filed June 11, 1928. Serial No. 284,303.

This invention relates to apparatus for drawing sheet glass and more particularly to improvements therein tending to facilitate, render more efficient and improve generally the drawing operation.

In accordance with the Colburn system for drawing sheet glass as disclosed in the patent to I. W. Colburn, No. 1,248,809, granted Dec. 4, 1917 a sheet of glass is drawn upwardly from a mass of molten glass contained in a relatively shallow receptacle or draw pot. Arranged above the mass of molten glass at opposite sides of the sheet are suitable lip tiles which are adapted to protect the sheet during its formative period from heated gases or hot air currents and to also deflect heat and gases downwardly upon the surface of the molten glass to aid in the proper conditioning thereof. However it has been found that the arrangement ordinarily employed has not proven effective under all conditions to protect the sheet from the heat currents nor to effectively direct the heat to properly control the temperature of the molten glass in the draw pot.

The principal aim and object of the present invention therefore is to provide improved means for use in sheet glass drawing apparatus which will effectively protect the sheet during its formative period from the heated gases or hot air currents present in and around the draw pot and furnace whereby to render possible the drawing of a sheet of improved quality.

Another object of the invention is the provision of means for positively removing heat and gases from near the surface of the molten glass from which the sheet is drawn in a manner to prevent the same from coming into contact with and injuriously affecting the sheet.

Another object of the invention is the provision of improved means for regulating the temperature beneath the lip tiles so as to provide for a more accurate and uniform control of the temperature of the molten glass in the draw pot.

Another object of the invention is to provide means for withdrawing excessive heat from beneath the lip tiles and for controlling the amount of and rapidity with which such heat is removed.

A further object of the invention is the provision of means for controlling the direction of movements of the heat currents beneath the lip tiles whereby the heat will be more evenly distributed over substantially the entire area of the molten glass beneath said lip tiles to effectively maintain the same at a more uniform temperature.

Still another object of the invention is to provide a new and improved form of lip tile arrangement wherein are provided flues in communication with the recesses or chambers beneath the lip tiles at the opposite ends thereof for conveying the heat and gases therefrom, said flues being in communication with a stack, the draft of which is regulatable in order that the removal of the heat and gases may be effectively controlled.

Other objects and advantages of the invention will become more apparent during the course of the following description when taken in connection with the accompanying drawings.

In the drawings forming a part of this application and wherein like numerals are employed to designate like parts throughout the same, Fig. 1 is a longitudinal vertical section through sheet glass apparatus constructed in accordance with the present invention, and Fig. 2 is a top plan view thereof.

The type of machine illustrated in the drawings is similar to the machine disclosed in the Colburn patent mentioned above, wherein a sheet 5 is continuously drawn from a mass of molten glass 6 contained in a suitable receptacle or draw pot 7 arranged in open communication with and receiving molten glass from the furnace 8 which may or may not be of the continuous tank type as desired. The sheet 5 is initially drawn in a generally vertical direction and is then deflected into the horizontal plane over a suitable bending member or roll 10 and passed horizontally through suitable drawing and flattening mechanism 11 into an annealing leer, not shown. The sheet may be maintained to width by any suitable width maintaining means such as the knurled rollers 12.

Arranged above the molten glass 6 at opposite sides of the sheet are the lip tiles 13 and 14 which are provided to protect the sheet 5 in its vertical run from heat currents and radiated heat which would otherwise strike the sheet, said lip tiles being also adapted to deflect heat and gases downwardly upon the surface of the molten glass. The draw pot 7 may be supported upon stools 15 preferably arranged within a suitable chamber 16 heated in any desired manner and in addition to heating the contents of the pot through the walls thereof, heat is supplied which passes up around the front end of the pot and is deflected downwardly upon the molten glass to assist in maintaining the same in a plastic workable condition. Heat absorbing shields or coolers 17 and 18 may be provided to cooperate with the lip tiles 13 and 14 respectively to assist in shielding the sheet of glass 5 from the said heat and gases if desired. The lip tiles 13 and 14 are shaped to provide chambers or recesses 19 and 20 thereunder which receive therein the heated gases and hot air currents which pass up around the front end of draw pot 7 from the pot chamber 16 and which also flow from the furnace 8 beneath the jack arch 21 as indicated by the respective arrows in Fig. 1.

While sheet drawing apparatus of the above described character is now in commercial use, the same has not proven effective under all conditions to protect the sheet from the heat currents nor to effectively direct the heat to properly control the temperature of the molten glass in the draw pot. It is therefore the purpose and primary object of this invention to provide an improved arrangement wherein the heat and gases may be removed from beneath the lip tiles in a manner to prevent the same from passing beneath the front ends thereof and coming into contact with the sheet, the means herein provided also rendering possible a more accurate control of the amount and direction of movement of the heat beneath the lip tiles whereby the temperature of the molten glass in the draw pot, and from which the sheet is drawn may be more accurately and uniformly regulated.

In accordance with the present invention, there is arranged at the opposite ends of the lip tile 13 the members or blocks 22 and 23 which constitute closures for the ends of the recess or chamber 19. These blocks are provided therein with the longitudinally extending flues 24 and 25 communicating at their forward ends with the chamber 19 beneath lip tile 13 and at their opposite ends with a common flue chamber 26 from which leads the transverse passage 27 communicating with the vertical stack 28 within which is arranged a damper 29.

Thus, the heat and gases which are conducted up around the front end of the draw pot, from the pot chamber 16, will be drawn towards the sides of the pot and removed through the flues 24 and 25 the same passing into the flue chamber 26 and thence through the passage 27 to the stack 28. In this manner, the liability of the heat and gases passing beneath the lip tile and striking against the sheet will be greatly minimized if not entirely obviated. The draft of the stack can be varied as desired upon proper operation of the damper 29 so that the amount of and rapidity with which the heat and gases are drawn from the recess or chamber 19 may be properly regulated. Thus, by increasing the draft of the stack, the removal of the heat from the recess 19 may be speeded up while a decrease in the draft will allow a suitable volume of heat to be built up within said recess. Since the heat and gases are caused to flow longitudinally of the chamber 19, the said heat and gases will be spread or distributed more evenly over substantially the entire width of the pot to more effectively control the temperature of the molten glass therein.

Arranged at the opposite ends of the lip tile 14 are the members or blocks 30 and 31, said blocks constituting closures for the opposite ends of the recess 20 and being provided with longitudinally extending flues 32 and 33 which communicate at their forward ends with the recess or chamber 20 beneath lip tile 14 and at their opposite ends with the upwardly converting passages 34 and 35 communicating with the common flue or flue chamber 36 leading to the stack 37, the draft of which is regulatable by means of the damper 38. Thus, the heat and gases passing beneath the jack arch 21 from the furnace 8 will be caused to flow longitudinally beneath the lip tile 14 and will be removed from the chamber 20 at the opposite ends thereof through the flues 32 and 33, the said heat and gases being conducted through the passages 34 and 35 to the flue 36 and thence to stack 37.

The same advantages result from the use of the end members 30 and 31 as result from the use of the members 22 and 23, these advantages being fully set forth hereinabove. The members 22, 23, 30 and 31 may be of a monolithic construction or may be composed of built up blocks or brick work as preferred.

By means of the hereinabove described arrangement, it will be apparent that it is possible to more effectively control the temperature of the molten glass within the draw pot whereby a continuous sheet of glass may be more efficiently produced and wherein the sheet is substantially completely protected from the action of heat currents and radiated heat. The means herein provided renders possible the positive removal of any excessive heat from beneath the lip tiles and effectively controls the direction of movement of the heat currents over the molten glass whereby to insure a more accurate and uniform control of the temperature thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim

1. In sheet glass apparatus, a receptacle containing a mass of molten glass, means for drawing a sheet therefrom, a lip tile arranged above the molten glass at one side of said sheet, and means at the opposite ends of said lip tile outwardly thereof for withdrawing heat and gases from therebeneath.

2. In sheet glass apparatus, a receptacle containing a mass of molten glass, means for drawing a sheet therefrom, a lip tile arranged above the molten glass at one side of said sheet, and means at the opposite ends of said lip tile for creating a draft beneath the lip tile in a manner to cause the heat and gases therebeneath to travel longitudinally of said tile and be withdrawn from the opposite ends thereof.

3. In sheet glass apparatus, a receptacle containing a mass of molten glass, means for drawing a sheet therefrom, a lip tile arranged above the molten glass at one side of said sheet, means at the opposite ends of the lip tile outwardly thereof for withdrawing heat and gases from therebeneath, and means for regulating the amount of and rapidity with which the heat and gases are removed.

4. In sheet glass apparatus, a receptacle containing a mass of molten glass, means for drawing a sheet therefrom, a lip tile arranged above the molten glass at one side of the sheet, and flues at the opposite ends of said lip tile outwardly thereof for withdrawing heat from therebeneath.

5. In sheet glass apparatus, a receptacle containing a mass of molten glass, means for drawing a sheet therefrom, a lip tile arranged above the molten glass at one side of the sheet, flues arranged at the opposite ends of said lip tile outwardly thereof for withdrawing heat from therebeneath, and means for creating a draft within said flues.

6. In sheet glass apparatus, a receptacle containing a mass of molten glass, means for drawing a sheet therefrom, a lip tile arranged above the molten glass at one side of the sheet, said lip tile being shaped to provide a chamber therebeneath, members positioned at opposite ends of said lip tile constituting closures for said chamber, said members being provided with flues in communication with said chamber for removing heat and gases therefrom.

7. In sheet glass apparatus, a receptacle containing a mass of molten glass, means for drawing a sheet therefrom, a lip tile arranged above the molten glass at one side of the sheet, members positioned at opposite ends of said lip tile constituting closures for said chamber, said members being provided with flues communicating with said chamber for removing heat and gases therefrom, a stack, and means placing said flues in communication with said stack.

8. In sheet glass apparatus, a receptacle containing a mass of molten glass, means for forming a sheet therefrom, a tile arranged above the molten glass in spaced relation thereto, and members arranged at opposite ends of the tile and forming end closures for the space between the tile and the molten glass, said members having flues therein for conducting heat from beneath said tile.

Signed at Shreveport, in the parish of Caddo and State of Louisiana, this 29th day of May, 1928.

JAMES T. ZELLERS.